US005105189A

United States Patent [19]
Murai et al.

[11] Patent Number: 5,105,189
[45] Date of Patent: Apr. 14, 1992

[54] PAGING APPARATUS FOR RECEIVING AND DISPLAYING MESSAGES

[75] Inventors: Makoto Murai; Tatsuaki Sekigawa, both of Hachioji, Japan

[73] Assignee: Kabushiki Kaisha Toshiba, Kawasaki, Japan

[21] Appl. No.: 553,603

[22] Filed: Jul. 18, 1990

[30] Foreign Application Priority Data

Jul. 19, 1989 [JP] Japan .................................. 1-186820

[51] Int. Cl.[5] ............................................... H04B 7/00
[52] U.S. Cl. ........................... 340/825.440; 340/311.1
[58] Field of Search ................. 455/31, 38; 340/311.1, 340/825.44, 825.46, 825.47, 825.48; 379/57

[56] References Cited

U.S. PATENT DOCUMENTS 4,477,808 10/1984 Ichikawa .............................. 455/38
4,872,005 10/1989 DeLuca et al. ................ 340/825.44
4,935,735 6/1990 DeLuca et al. ................ 340/825.44

FOREIGN PATENT DOCUMENTS 0211825 9/1988 Japan ................................ 340/311.1
2149164 6/1985 United Kingdom ........... 340/825.44

OTHER PUBLICATIONS

Motorola Publication, "PMR 2000 Series ", 1987, pp. 3, 11, 12.
Motorola Publication, ", Jun. 1987.

*Primary Examiner*—Donald J. Yusko
*Assistant Examiner*—Dervis Magistre
*Attorney, Agent, or Firm*—Oblon, Spivak, McClelland, Maier & Neustadt

[57] ABSTRACT

A paging apparatus includes a first switch for turning on/off a power supply, a second switch, a memory for storing a received message, a display for displaying a message read out from the memory, a switch operation detector for detecting operations for the first and second switches, and a message controller for selectively executing a display mode of displaying the message, a preservation mode of preserving the message in the memory, and a clear mode of clearing the message stored in the memory, in response to a conbination of operations of the first and second switches detected by the switch operation detector.

13 Claims, 5 Drawing Sheets

PAGING APPARATUS FOR RECEIVING AND DISPLAYING MESSAGES

BACKGROUND OF THE INVENTION

1. Field of the Invention

The present invention relates to a paging apparatus having a message memory function.

2. Description of the Related Art

In recent years, as a new paging system, a system which calls a certain paging apparatus and can transfer a message from a base station to display it on the paging signal transmitted from a base station is received and demodulated by a receiving circuit of an apparatus, and the demodulated signal is input to a control circuit. The control circuit collates an ID code included in the received paging signal with the ID code prestored in an ID-ROM disposed in the paging apparatus. Upon collation, if two codes coincide with each other, the control circuit supplies a ringing signal to a loudspeaker via a driver. For this reason, the loudspeaker generates a ringing tone, and it is signaled to a user whose apparatus is paged. When the two ID codes coincide with each other, the control circuit decodes a message code included in the received paging signal together with the ID code, and causes a liquid crystal display to display the decoded message.

The apparatus of this type comprises a message memory, and the received message code is stored in the message memory. For this reason, after a display of the received message is turned off, the received message can be read out from the message memory as needed, and can be redisplayed on the liquid crystal display. However, the number of messages to be stored in the message memory is limited. Thus, when a new message code is received while the memory is full, the oldest message code is cleared, and the new message code is stored.

The paging apparatus having the message memory has, e.g., a "preservation mode" and a "clear mode" in addition to a "display mode" as control modes associated with message code control. In the preservation mode, when a new message is received while the memory is full, the already stored message codes are prevented from being cleared. In the clear mode, when a message code stored in the memory becomes unnecessary, the message code is cleared. These "preservation" and "clear" modes are executed by the following operations as well as the "display mode".

More specifically, the paging apparatus comprises three, i.e., first to third message control switches. When the "display mode" is to be executed, the first switch is depressed, and the paging apparatus is set in the display mode. Thus, of a plurality of message codes stored in the message memory, the latest message code, for example, is read out, is decoded by a CPU, and is displayed on the liquid crystal display. In this state, when the second switch is depressed once, the second latest message code is read out from the message memory, and is displayed on the liquid crystal display after the code is decoded. Thereafter, every time the second switch is depressed once, the message codes are read out from the message memory one by one from the new one, and are displayed on the liquid crystal display in turn.

In the "preservation mode", a message to be preserved is read out from the message memory, and is displayed on the liquid crystal display upon operation in the "display mode". In this state, the third switch is depressed once, and the paging apparatus is set in the preservation mode. Thereafter, the first switch is depressed. Thus, the message displayed on the liquid crystal display is protected from being naturally cleared upon reception of a new message code, and is then stored in the message memory in the protected state.

In the "clear mode", a message to be cleared is read out from the message memory and is displayed on the liquid crystal display upon operation in the "display the third switch is successively depressed twice, and the paging apparatus is set in the clear mode. Thereafter, the first switch is depressed. Thus, the message displayed on the liquid crystal display is cleared from the message memory.

In the above-mentioned system, however, three switches are required to execute the message display, preservation, and clear modes. For this reason, the apparatus becomes bulky, and this undesirably causes a decrease in reliability and an increase in cost.

SUMMARY OF THE INVENTION

It is an object of the present invention to provide a paging apparatus which can reduce the number of switches necessary for executing a plurality of kinds of operation modes associated with message control, and can attain a compact paging apparatus, an improvement in reliability, and a decrease in cost.

According to the present invention, a paging apparatus having a power switch for ON/OFF-controlling a power supply and a message memory which can store a plurality of messages sent from a base station, comprises a message control switch, and a message control circuit. The message control circuit selectively executes a plurality of predetermined operation modes associated with control of messages stored in the message memory according to a combination of the message control switch and the power switch.

According to the paging apparatus with the above arrangement, a plurality of operation modes associated with message control such as message display, preservation, and clear modes can be executed by a combination of operations of the new message control switch and the existing power switch. For this reason, the number of switches can be reduced, and the apparatus can be rendered compact accordingly. A decrease in number of switches leads to an improvement in reliability of the paging apparatus, and to a decrease in cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
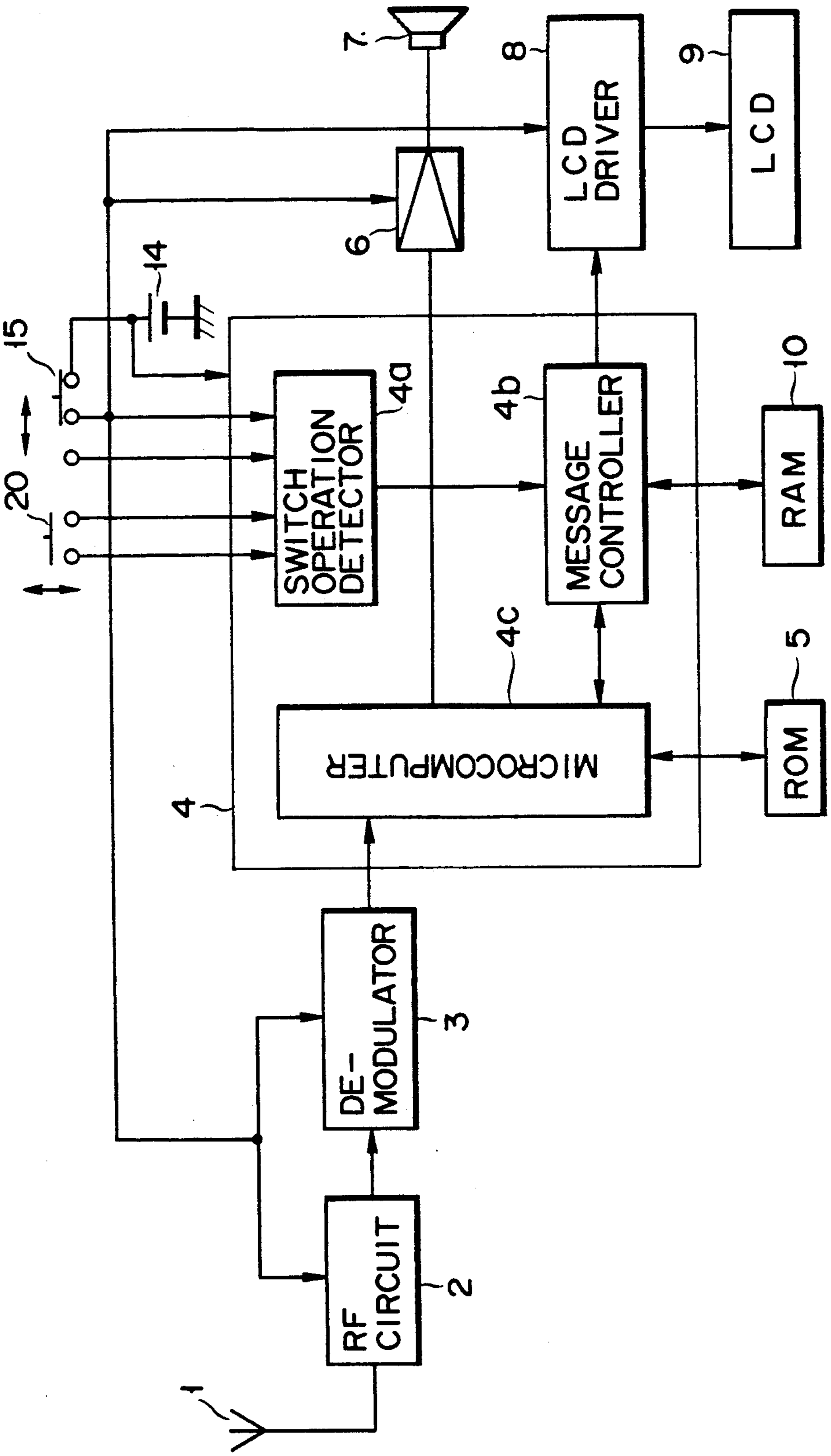
FIG. 1 a schematic block diagram of a paging apparatus according to an embodiment of the present invention.

In FIG. 1, a paging signal sent from a base station (not shown) is received by an RF (radio frequency) circuit 2 via an antenna 1. The output terminal of the RF circuit 2 is connected to the input terminal of a demodulator 3 for demodulating a received signal. The output terminal of the demodulator 3 is connected to a control section 4.

The control section 4 comprises a microcomputer 4c connected to the output terminal of the demodulator 3, and a switch operation detector 4a and a message controller 4b which are connected to the microcomputer 4c. The microcomputer 4c is connected to an ID code memory, i.e., a ROM 5 for prestoring an ID code of its own apparatus, and is also connected to a loudspeaker 7 via an amplifier 6. The switch operation detector 4a is connected to a power switch 15 and a message control switch 20, and detects operation states of these switches. The message controller 4b is connected to a RAM 10 for storing received messages, and an LCD driver 8, and controls the LCD driver 8 according to a detection signal from the switch operation detector 4a. The LCD driver 8 is connected to an LCD (liquid crystal display) 9, and causes the LCD 9 to display a message according to a signal from the message controller 4b.

A battery 14 is connected to the amplifier 6 and the LCD driver 8 via the power switch 15. The battery 14 is directly connected to the control section 4. The control section 4 is always powered regardless of the ON/OFF state of the power switch 15, and is always set in an operation enable state.

The microcomputer of the control section 4 has a paging signal receiving function, an ID code collation function, a paging control function, and the like, and controls the message controller 4b. The message controller 4b controls display, preservation, and clear modes of a stored message in a predetermined sequence according to the detection result of the switch operation detector 4a in a receiving standby state.

The operation of the paging apparatus with the above arrangement will be described below.

A paging signal transmitted form a base station is received by the RF circuit 2 of the apparatus, and is demodulated by the demodulator 3. The demodulated signal is supplied to the control section 4. The microcomputer 4c of the control section 4 collates an ID code included in the paging signal with the ID code prestored in the ROM 5. Upon collation, if the two codes coincide with each other, the microcomputer 4c supplies a ringing signal to the loudspeaker 7 via the amplifier 6. Thus, the loudspeaker 7 generates a ringing tone, and it is signaled to a user whose apparatus is paged. When the two ID codes coincide with each other, the microcomputer 4c decodes a message code included in the paging signal together with the ID code, and supplies the decoded message to the LCD 9 via the LCD driver 8, thus displaying the message on the LCD 9. Furthermore, the received message code is stored in the message memory (RAM) 10.

Figure 4A:
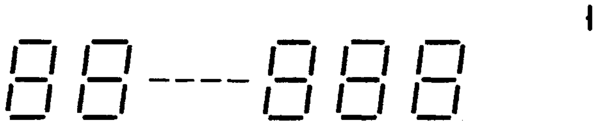
FIGS. 4A to 4C show display states.

In the above operation, in a receiving standby microcomputer 4c of the control section 4 repetitively executes paging signal receiving control accompanying a battery saving operation, and message control associated with processing of messages stored in the message memory 10. In this state, assuming that the user of the paging apparatus depresses the message control switch 20, the switch operation detector 4a detects an ON event of this switch 20 (step 2a), and the flow advances to step 2b. In step 2b, the message controller 4b reads out a message code stored in an arbitrary memory area n in the message memory 10, and decodes the readout message code. The controller 4b then supplies the decoded message code to the LCD 9 via the LCD driver 8, and causes the LCD 9 to display the message. In this case, the message controller 4b causes the LCD 9 to display a memory area number n of the message together with the message. More specifically, the message stored in the memory area n=1 is displayed, as shown in FIG. 4A.

In a state wherein one message is displayed, the message controller 4b repetitively monitors in steps 2c and 2d if a predetermined period of time has passed from the beginning of a display and if the switch 20 is depressed. If the predetermined period of time has passed, the flow advances to step 2e. In step 2e, the message controller 4b clears the message displayed on the LCD 9, and returns to a standby state. However, if the user depresses the switch 20 before the predetermined period of time passes, the flow advances from step 2d to step 2f. In step 2f, the message controller 4b checks if the last message stored in the message memory (RAM) 10 is displayed. If there is a message which has not been displayed yet, the flow advances to step 2g, stored in the next memory area n+1, and causes the LCD 9 to display the message.

In step 2h, the message controller 4b increments the value n (n+1), and the flow then returns to step 2c. As long as messages which have not been displayed are left in the message memory 10, the message controller 4b repeats the above-mentioned control. Every time the user depresses the switch 20, messages stored in the message memory 10 are read out in turn, and are displayed on the LCD 9.

Figure 3:
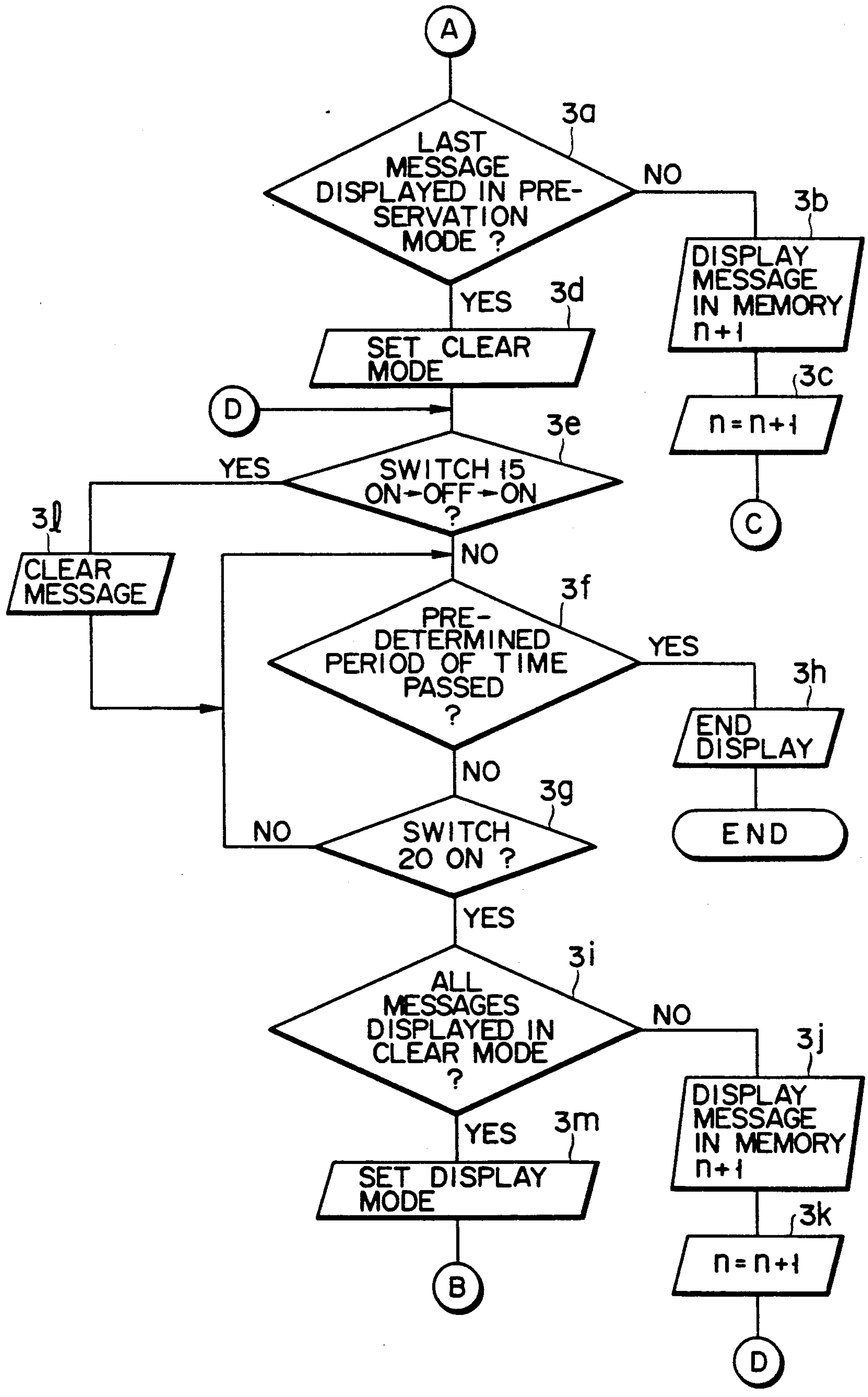
Figure 4B:
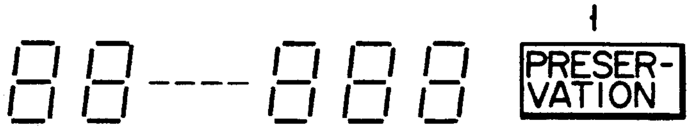

When the user further depresses the switch 20 while the last message in the message memory 10 is displayed, the flow advances to step 2i to set a preservation mode. In this case, the LCD 9 displays a message, its memory area number n, and a message indicating that the preservation mode is set, as shown in, e.g., FIG. 4B. When the preservation mode is set, the switch operation detector 4a detects an operation of the power switch 15 in step 2j. When the power switch 15 is not operated, the message controller 4b repetitively monitors in steps 2k and 2l if a predetermined period of time has passed from the beginning of a display and if the switch 20 is depressed. If the predetermined period of time has passed, the controller 4b ends the message display mode. However, when the user depresses the switch 20 before the predetermined period of time passes, the flow advances to step 3a, as shown in FIG. 3, and the message controller 4b checks if all the messages stored in the message memory 10 are displayed in the preservation mode. If NO in step 3a, the flow advances to step 3b, and the message controller 4b reads out a message code stored in the next memory area n+1 of the message memory 10 and causes the LCD 9 to display the message. After the value n is incremented (n+1) in step 3c, the flow returns to step 2*j*. Thereafter, every time the switch 20 is depressed, the above-mentioned operation is repeated until all the messages are displayed on the LCD 9.

During control of the preservation mode, assume that the user temporarily turns off the power switch 15, and then turns it on in a state wherein a desired message is displayed on the LCD 9. In this case, the switch operation detector 4*a* detects the operation of the power switch 15 (step 2*j*), and the flow advances to step 2*n*. In step 2*n*, the message controller 4*b* adds a protection mark prepared in advance to a message code stored in the message memory 10 and corresponding to the displayed message. The message code with the protection mark will not be cleared from the message memory even if a new message code is received and stored later.

Note that power supply to respective circuit sections of the apparatus is temporarily cut upon an OFF operation of the power switch 15. However, since the control section 4 directly receives a power supply output from the battery 14 without going through the power switch 15, the control operation of the control section 4 will not be initialized or cause an error due to an OFF operation of the power switch 15.

Figure 4C:
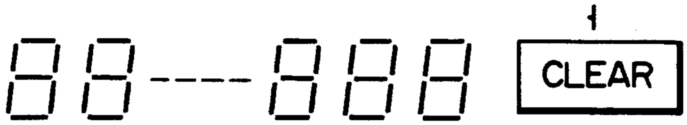

When the user further depresses the switch 20 in the preservation mode (step 2), it is checked if the last message stored in the message memory 10 is displayed (step 3*a* in FIG. 3). If YES in step 3*a*, the flow advances to step 3*d*, and the clear mode is set. In this case, the LCD 9 displays a message, its memory area number n, and a message indicating the clear mode, as shown in, e.g., FIG. 4C. When the clear mode is set, every time a message is displayed on the LCD 9, the OFF operation of the power switch 15 is detected as in the preservation mode (step 3*e*), and it is repetitively monitored in steps 3*f* and 3*g* if a predetermined period of time has passed and is the switch 20 is depressed. Assuming that the user depresses the power switch 15 while a desired message is displayed on the LCD 9, the flow advances to step 3*l*, and the microcomputer 4*c* clears a message code corresponding to the displayed message from the message memory 10. Thus, a message stored in the message memory 10 is forcibly cleared.

Figure 2:
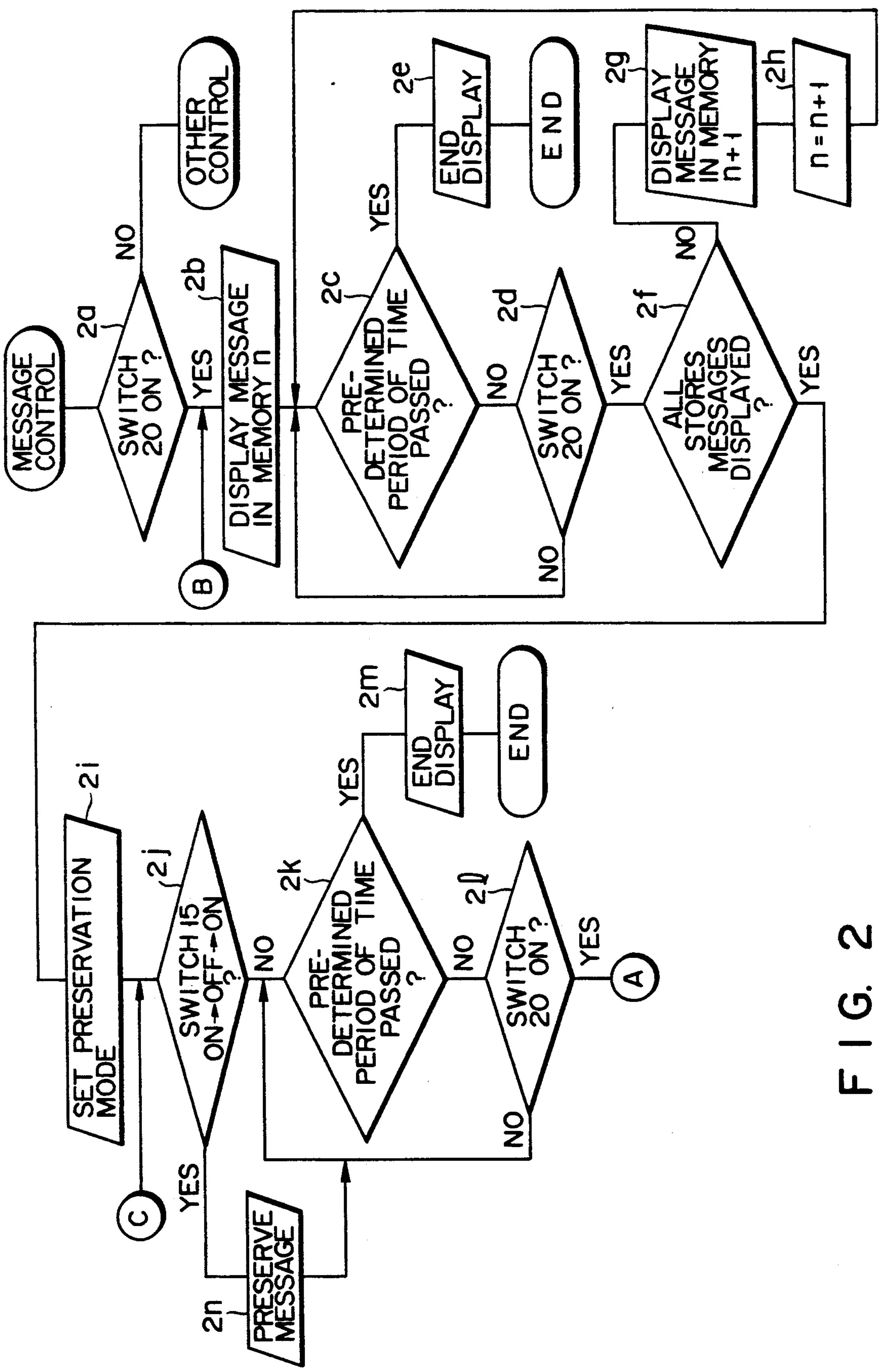
FIGS. 2 and 3 are flow charts showing a control sequence and a control content of a control section of the apparatus shown in FIG. 1.

When the user further depresses the switch 20 while the last message stored in the message memory 10 is displayed in the clear mode, the flow advances from step 3*i* to step 3*m*, and the display mode is set. Thereafter, the flow returns to step 2*b* in FIG. 2, and the above-mentioned control operation is repeated.

In this embodiment, every time the message controls switch 20 is depressed once, message stored in the message memory 10 are sequentially read out one by one, and are displayed on the LCD 9. When the switch 20 is further depressed while the last message is displayed, the operation mode is changed like "display mode"→"preservation mode"→"clear mode" in turn. When the power switch 15 is depressed in the "preservation mode" or the "clear mode", the displayed message is protected or cleared. Therefore, according to the present invention, the "display", "preservation", and "clear" operations of messages stored in the message memory 10 can be executed by combinations of operations of the message control switch 20 and the existing power switch 15. For this reason, one switch 20 need only be arranged for message control, and the paging apparatus can be rendered compact accordingly. Since the number of switches can be reduced, cost of the paging apparatus can be decreased, and reliability can be improved.

Figure 5:
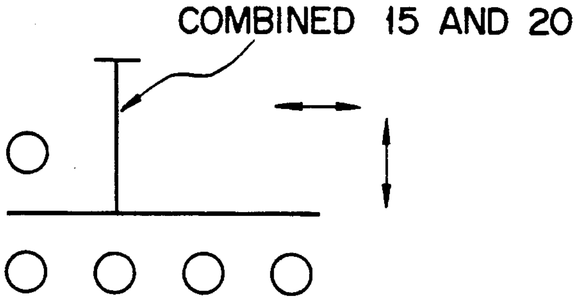
FIG. 5 is an alternative embodiment of the switch 15 and 20 of FIG. 1.

The present invention is not limited to the above embodiment. For example, in the above embodiment, the message control switch 20 is arranged in addition to the power switch 15. However, these switches may be constituted by a composite switch including a slide switch and a push-button switch (as shown in FIG. 5). In this manner, a plurality of kinds of message control operations can be executed by only the power switch, and the paging apparatus can be made more compact. In addition to the step of preserving or clearing only a displayed message, the step of preserving or clearing all the messages may be provided. The arrangement of the power switch and the message control switch, kinds of operations associated with message control, a control sequence and content of the control section, and the like may be variously modified within the spirit and scope of the invention.

What is claimed is:

1. A paging apparatus for receiving and displaying at least one message transmitted from a base station, comprising:

memory means for storing a plurality of messages transmitted from the base station;

switch means connected to a power supply and said memory means, and including a first switch connected to the power supply, for turning the power supply on/off and a second switch used for sequentially reading out the messages from said memory means;

display means connected to said memory means, for sequentially displaying the messages read out from said memory means; and control means connected to said first and second switches, for selectively executing a plurality of operation modes, said control means changing the operation mode to another operation mode in response to an operation of said second switch after said control means detects that the last one of the messages is displayed, and executing another operation mode in response to an operation of said first switch, wherein when the last message has appeared on said display means, said second switch does not reset the display to the first message, but can be operated to change the operation mode.

2. An apparatus according to claim 1, wherein said control means comprises switch detection means, connected to said first and second switches, for detecting operations of said first and second switches, and message control means for changing the operation mode to another operation mode in response to every operation of said second switch detected by said switch detection means after the last one of the messages is displayed.

3. An apparatus according to claim 2, wherein said control means selectively executes the operation modes including a display mode of displaying the message, a preservation mode of preserving the message in said memory means in response to the operation of said first switch.

4. An apparatus according to claim 3, wherein said message control means has a function of adding protection data for inhibiting clearing to a message to be preserved in the preservation mode.

5. An apparatus according to claim 3, wherein the message control means adds preservation mark data to the message in response to a temporary OFF event of said first switch in the preservation mode.

6. An apparatus according to claim 1, wherein said message control means sets the clear mode for clearing a message stored in said memory means in response to a reoperation of said second switch by said switch detection means after the preservation mode is set.

7. A paging apparatus comprising:

reception means for receiving a paging signal transmitted from a base station and including an ID code and a message;

recognition means connected to said reception means, for comparing the ID code included in the paging signal and an ID code assigned to said paging apparatus, and recognizing paging upon coincidence between the two ID codes;

signaling means connected to said recognition means, for signaling paging in response to paging recognition by said recognition means;

memory means connected to said reception means, for storing a plurality of messages transmitted from the base station;

switch means connected to a power supply and said memory means, and including a first switch connected to the power supply, for turning the power supply on/off, and a second switch used for sequentially reading out the messages from said memory means;

display means connected to said memory means, for sequentially displaying the messages read out from said memory means; and control means connected to said first switching means, for selectively executing a plurality of operation modes, said control means changing the operation mode to another operation mode in response to an operation of said second switch after said control means detects that the last one of the messages is displayed, and executing another operation mode in response to an operation of said first switch, wherein when the last message has appeared on said display means, said second switch does not reset the display to the first message, but can be operated to change the operation mode.

8. An apparatus according to claim 7, wherein said control means comprises switch operation detection means, connected to said first and second switches, for detecting operations of said first and second switches, and message control means for changing the operation mode to another operation mode in response to every operation of said second switch detected by said switch detection means after the last one of the messages is displayed.

9. An apparatus according to claim 8, wherein said message control means sequentially sets the display, preservation, and clear modes every time said switch operation detection means detects the operation of said second switch, and executes the operation mode set when said switch operation detection means detects the operation of said first switch in the preservation and clear modes.

10. An apparatus according to claim 7, wherein said switch means comprises a slide switch constituting said first switch, and a push-button switch constituting said second switch.

11. An apparatus according to claim 10, wherein said switch means comprises a composite switch integrally combining said slide and push-button switches.

12. An apparatus according to claim 11, wherein said switch means comprises a slide switch constituting said first switch, and a push-button switch constituting said second switch.

13. An apparatus according to claim 12, wherein said switch means comprises a composite switch integrally combining said slide and push-button switches.

* * * * *